Aug. 10, 1943.     O. H. BANKER     2,326,279
AUTOMATIC CLUTCH MECHANISM
Filed May 29, 1939     6 Sheets-Sheet 2

INVENTOR
Oscar H. Banker
BY
ATTORNEY

Aug. 10, 1943.    O. H. BANKER    2,326,279
AUTOMATIC CLUTCH MECHANISM
Filed May 29, 1939    6 Sheets-Sheet 4

*Fig. 5*

INVENTOR
Oscar H. Banker,
BY
ATTORNEY

Patented Aug. 10, 1943

2,326,279

UNITED STATES PATENT OFFICE 2,326,279

AUTOMATIC CLUTCH MECHANISM

Oscar H. Banker, Chicago, Ill., assignor to New Products Corporation, Chicago, Ill., a corporation of Delaware Application May 29, 1939, Serial No. 276,303

30 Claims. (Cl. 192—105)

More particularly the invention relates to automatic clutches embodying speed responsive mechanism. This application is a continuation in part of my prior applications Serial No. 673,149, filed May 27, 1933 and now abandoned, and Serial No. 164,025, filed September 15, 1937, now Patent No. 2,237,297 issued April 8, 1941.

It is the general object of the invention to provide a new and improved automatic clutch mechanism.

Another object is to provide a new and improved clutch automatically operable by speed responsive mechanism, which is controlled by the speed of the engine and in which a manual control of the clutch is also provided, and, more particularly, to simplify and improve clutches of this type by providing a compact and efficient arrangement for operation of the clutch by the speed responsive mechanism.

Another object is to provide an automatic clutch particularly adapted for use in automotive vehicles, and to provide a construction in which the speed responsive mechanism is compactly mounted adjacent a pressure plate which is associated with the clutch disk.

Another object is to provide a clutch mechanism in which disengagement of the clutch is effected at a lower speed than its engagement, thus eliminating much of the wear and the heating and burning of the clutch parts, and providing for a longer life.

Another object is to provide an automatic clutch that can be changed to a conventional, manually operable clutch when the occasion requires, such as when pushing a car to start its motor, or parking a car on a grade in gear. or coasting down hill against engine compression.

Another object is to provide a new and improved disk type clutch embodying centrifugally operable elements and toggle linkages intermediate said elements and a pressure plate for engaging and disengaging the clutch.

A further object is to provide an automatic clutch particularly adapted for automotive vehicles embodying a means functioning when the engine is stopped to engage the clutch.

Other objects will become readily apparent from the following detailed description taken in connection with the accompanying drawings, in which.

While there is shown in the drawings and hereinafter described in detail three different forms of the invention, it is to be understood that the invention is not limited to the particular constructions and arrangments shown, it being contemplated that various changes can be made by those skilled in the art without departing from the spirit and scope of the invention as expressed in the accompanying claims.

Figure 1:
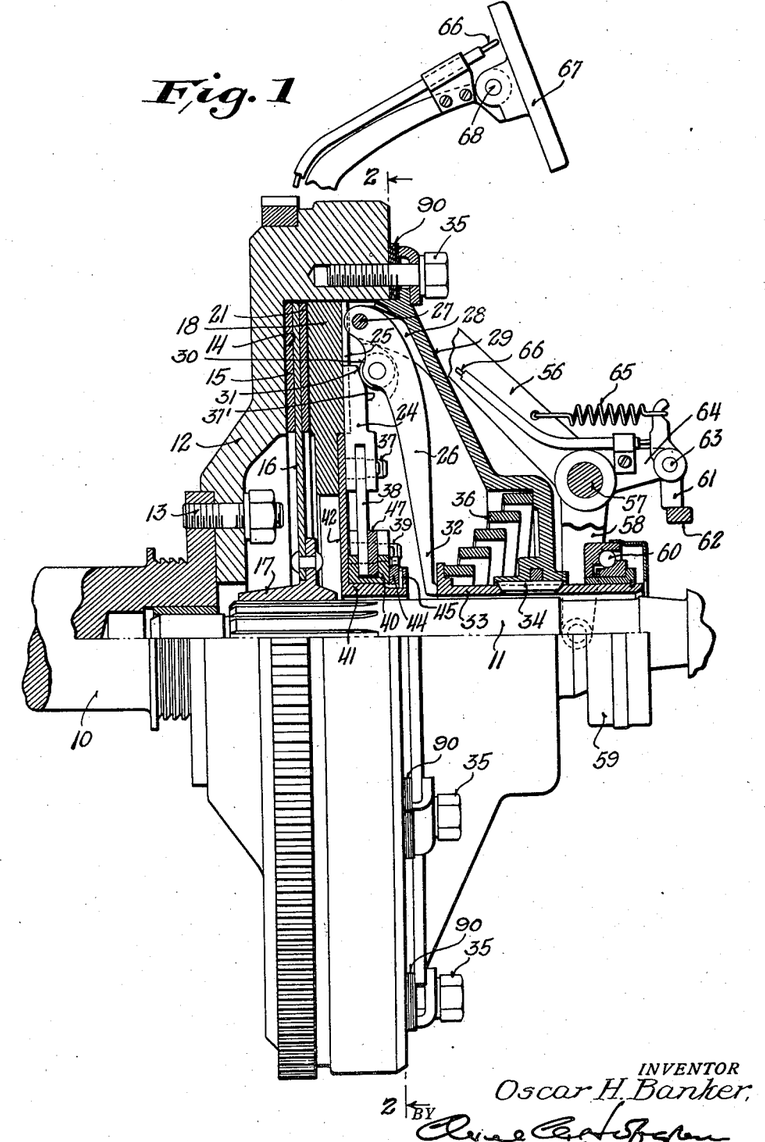
Fig. 1 is a view of a clutch mechanism embodying the invention with the lower half shown in full while the upper half shows a central vertical section through said mechanism.
Figure 3:
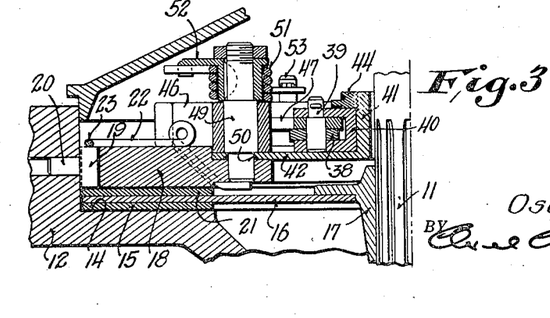
Fig. 3 is a detail horizontal sectional view taken on the line 3—3 of Fig. 2.

Referring to Figs. 1 and 3 of the drawings, the numeral 10 designates the drive shaft or engine shaft, 11 the driven shaft or transmission shaft, and 12 the flywheel secured to the shaft 10 by the bolts 13.

The flywheel forms one of the clutch elements and has a clutch face 14 adapted to be engaged by the adjacent friction face 15 of the clutch element 16 which is in the form of a disk whose hub 17 is slidably splined to the driven shaft 11.

A clutch element 18 is in the form of an annular plate which is slidably keyed to the flywheel 12 by slidable engagement with the flat sided heads 19 of key pins 20 mounted in said flywheel. This plate is adapted to be moved laterally into engagement with the friction face 21 of the disk 16 and acts to press the face 15 of said disk into clutched engagement with the clutch face 14 of the flywheel to establish a driving relation between said drive and driven shafts. This clutch element 18 is normally held in release position by equally spaced radially disposed springs 22. One end of each spring 22 is suitably anchored to the plate 18 while the other end 23 engages the head 19 of one of the key pins 20.

Figure 2:
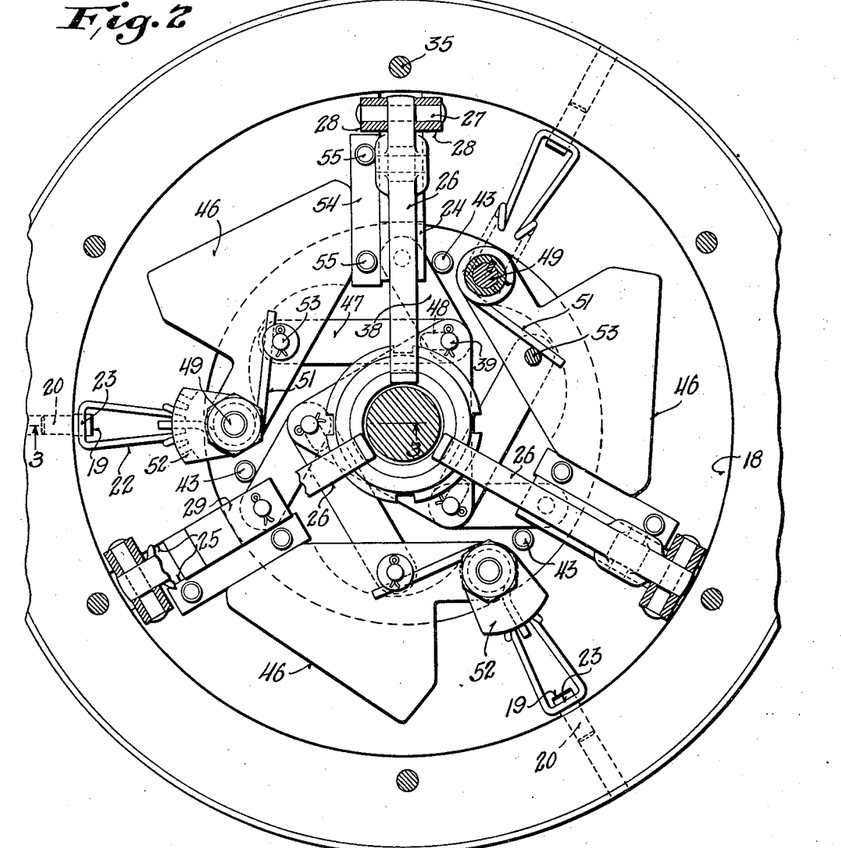
Fig. 2 is a detail vertical sectional view taken on the line 2—2 of Fig. 1.

Wedge blocks 24 are slidably mounted in equally spaced radially disposed grooves 25 formed in the plate 18 and are adapted to cooperate with a movable backing means including adjacently mounted clutch levers 26. One end of each clutch lever 26 is pivotally mounted on a pin 27 mounted in ears 28 on a housing member 29 and carries a roller 30 engageable with the adjacent face of the wedge block 24 including the inclined portion 31. The free ends 32 of the levers 26 are adapted to engage the flanged end of a shift collar or sleeve 33 which is slidably keyed at 34 to the hub of the housing member 29 which is secured to the flywheel 12 by the bolts 35.

A relatively heavy coiled spring 36 is interposed between the housing member 29 and the flanged end of said sleeve 33 and normally acts through said sleeve upon the levers 26 to swing them toward the left and thus through the rollers 30 and blocks 24 put pressure on the plate 18 so as to move it against the disk 16 and bring said disk into clutched engagement with the flywheel.

For the normal automatic operation of the clutch, speed responsive means are provided for moving the wedge blocks 24 relative to the plate 18 and levers 26. Each of the blocks 24 is pivotally connected by a pin 37 to one end of a link 38 which is pivotally connected by a pin 39 to an equalizer member 40 mounted to turn freely on the hub of a bearing member 41 whose web or disk portion 42 is secured by rivets 43 to the plate 18, said equalizer being held against longitudinal movement by the nut 44 in threaded engagement with the threaded end of said bearing member and also locked thereto by the lock key 45.

Governor weights 46 are each operatively connected by a link 47 with the equalizer member 40 and more particularly by a lost motion connection of the slotted end 48 of the link with the proper pin 39, so as to allow a certain amount of fluctuation of the weights without releasing the pressure members 24.

Each of the weights 46 is pivotally mounted on a stud 49 which is here shown as secured to the disk portion 42 by welding, indicated at 50, and each weight is normally held in contracted position by a coiled torsion spring 51, adjustably anchored at one end in one of the locking recesses of a plate 52 fast on the stud 49, and engaging the pin 53 at its other end. In its contracted position, each weight engages a stop block 54 secured by rivets 55 to the plate 18.

With the above construction, as the speed of rotation of the plate 18, keyed to the flywheel 12, increases, the weights 46 swing outwardly under the influence of centrifugal force and thus through the links 47 exert a turning movement of the equalizer 40 in a counterclockwise direction as viewed in Fig. 2 and hence an outward thrust on the links 38 and the wedge blocks 24. Under these conditions, the sleeve 33 is held back to relieve the clutching pressure of the spring 36 upon said sleeve and on the levers 26. As a consequence, when the wedge blocks 24 are moved radially outwardly by the speed responsive means above described they tend to wedge themselves between the plate 18 and the rollers 30 of the levers 26 and thus act to engage the clutch and to swing the levers 26 toward the right and thus through the sleeve 33 compress the spring 36. Thus as the inclined surfaces 31 of the blocks 24 pass the rollers 30 the clutch is engaged and this action takes place at a certain predetermined speed at which the weights 46 are overcoming the resistance of their own springs 51, the release springs 22 and the spring 36. Above this clutching speed, the flat faces or dwells 31' of the blocks 24 move past the rollers so that, as the speed is increased, pressure on the clutch faces is not increased relatively to the speed. Under these conditions the forces acting to retract the weights 46 to release the clutch are less, since the spring 36 is prevented from acting to release the clutch and is actually exerting pressure through the lever 26 upon the blocks 24 retarding their movement to release position. Hence the speed at which release of the clutch takes place will be much less than that at which the clutch is engaged.

For disengaging the clutch manually, under conditions of emergency engagement or at any other time, a clutch pedal 56 is pivotally mounted at 57 and has a throwout fork portion 58 engageable with a collar or ring 59 which has a ball bearing journal mounting 60 on the outer end of the sleeve 33. The downward swinging movement of the clutch pedal 56 acts through the collar 59 to shift the sleeve 33 toward the right to relieve the levers 26 of the pressure of the spring 36 whether said spring is acting thereon for emergency engagement or is being compressed through action of the weights 46, the blocks 24 and the levers 26 as previously described.

The arrangement of the parts shown is such that normally when the engine is stopped or in idling speed the pressure transmitting member 24 is withdrawn and the backing means is limited in its travel by the fork portion 58 whose travel is limited so as to prevent any pressure being transmitted to plate 18 through the member 24. For limiting the travel of the fork portion 58 to permit normal automatic operation of the mechanism a stop member 61 is mounted on the pedal 56 and adapted to engage a fixed stop 62. The stop member 61 is preferably in the form of a lever pivotally mounted intermediate its ends on a pin 63 carried by an arm 64 of said pedal and is normally held in an operative position by a spring 65 connecting the upper end of said lever 61 with said pedal. Release of the stop member 61 from its holding position is accomplished by a Bowden wire 66 which forms an actuator between said lever and the operator controlled foot plate 67 pivotally mounted at 68 on the upper end of the clutch pedal on lever 56. Thus tilting the upper end of the plate 67 toward the left will exert a thrust on the wire 66 which in turn will act on the upper end of the lever 61 to swing it toward the right and thus release it from the fixed stop 62 so that sleeve 33 under the action of the spring 36 travels further and acts on the levers 26 and members 24 regardless of the position of said members 24 to hold the clutch in emergency engagement. Movement of the clutch control sleeve 33 to release position is of course permitted regardless of the position of the stop member 61.

Figure 4:
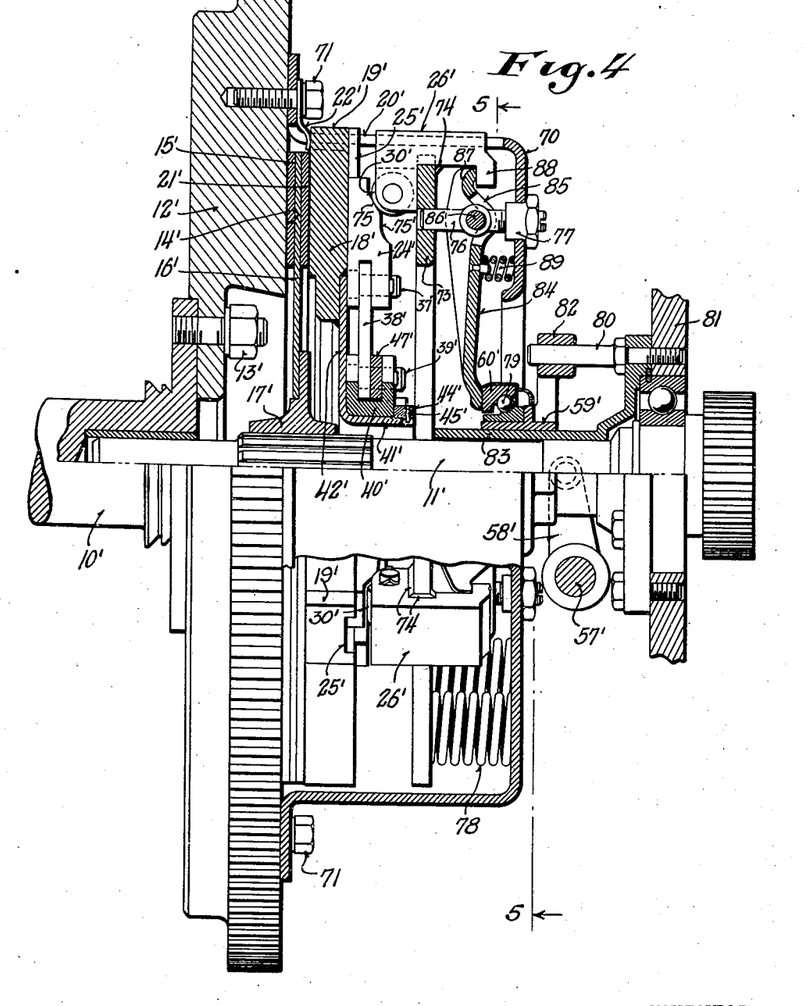
Fig. 4 is a view similar to Fig. 1 showing certain modifications and with parts of the lower half broken away and parts in section.
Figure 5:
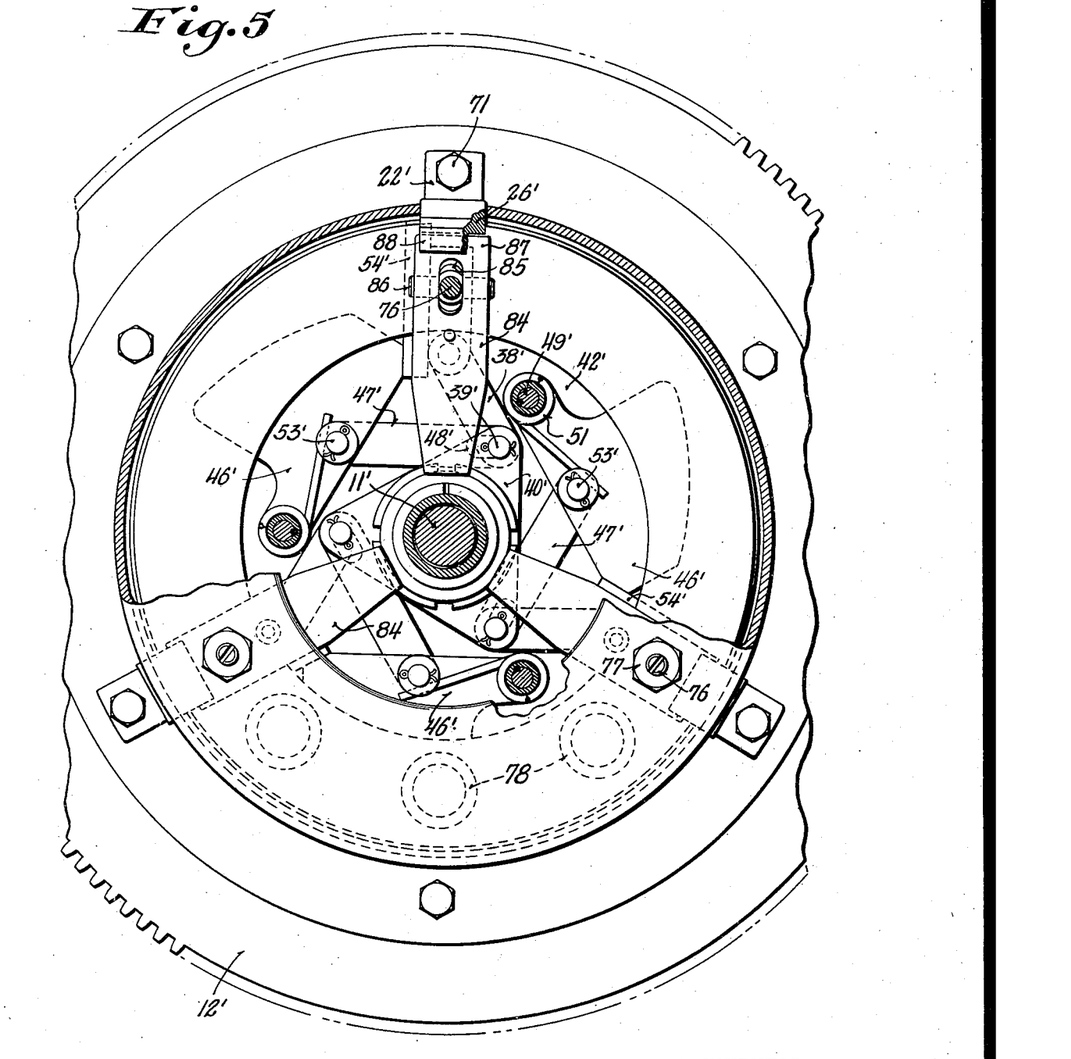
Fig. 5 is a vertical sectional view taken generally along the broken line 5—5 of Fig. 4.

The construction shown in Figs. 4 and 5 is generally similar to that above described. The principal difference is in the means for producing the emergency engagement of the clutch and for releasing the clutch.

In this modification, the numeral 10' designates the drive shaft or engine shaft, 11' the driven or transmission shaft, and 12' the flywheel secured to the shaft 11' by the bolts 13'.

The flywheel forms one of the clutch elements and has a clutch face 14' adapted to be engaged by the adjacent friction face 15' of the clutch element 16' which is in the form of a disk whose hub 17' is slidably splined to the driven shaft 11'.

A clutch element 18' is in the form of an annular pressure plate which is slidably keyed to the flywheel 12' by key projections 19' working in slots 20' in a casing 70 secured by bolts 71 to the flywheel 12'. This plate 18' is adapted to be moved laterally into engagement with the friction face 21' of the disk 16' and acts to press the face 15' of said disk into clutched engagement with the clutch face 14' of the flywheel to form a driving relation between said drive and driven shafts. This clutch element 18' is normally held in release position by equally spaced radially disposed flat springs 22'.

Wedge blocks 24' are slidably mounted in equally spaced radially disposed grooves 25' formed in the plate 18' and are adapted to cooperate with a movable backing means including adjacently disposed members 26'. Each of these members 26' is fixedly secured to an annular spring plate 73, as by welding indicated at 74, and carries a roller 30' engageable with the adjacent face of the wedge block 24' including the inclined portion 75. The sides of the members 26' are slidably mounted in the key slots 20' and thus act as guides for said members and the plate 73.

The plate 73 is also slidably guided by equally spaced radially disposed studs 76 adjustably mounted in threaded bushings 77 mounted in the casing 70. The plate 73 with the members 26' is normally urged to clutch applying position by a plurality of coiled springs 78 interposed between said plate and the end wall of the casing 70 and some of which are shown in the drawings. Thus the pressure of the springs 78 on the backing means acts through the rollers 30' and blocks 24' to put pressure on the plate 18' so as to move it against the disk 16' and bring said disk into clutched engagement with the flywheel.

For normal automatic operation of the clutch, speed responsive means are provided for moving the wedge blocks 24' relative to the plate 18' and the members 26' generally similar to the first described construction. Each of the blocks 24' is pivotally connected by a pin 37' to one end of a link 38' which is pivotally connected by a pin 39' to an equalizer member 40' mounted to turn freely on the hub of a bearing member 41' whose web or disk portion 42' is secured to the plate by welding, said equalizer being held against longitudinal movement by the nut 44' in threaded engagement with the threaded end of said bearing member and also locked thereto by the lock key 45'.

Governor weights 46' are each operatively connected by a link 47' with the equalizer member 40' and more particularly by a lost motion connection of the slotted end 48' of the proper pin 39' as to allow a certain amount of fluctuation with the weights without releasing the pressure member 24'.

Each of the weights 46' is pivotally mounted on a stud 49' which is secured to the disk portion 42' in a manner similar to the connection of the stud 49 with the disk portion 42. Each weight is normally held in contracted position by a coiled tension spring 51 suitably anchored at one end to the stud 49' and engaging the pin 53' at its other end. In its contracted position each weight engages a stop block 54' secured to the plate 18'.

The action of the above described modification is similar to the first form described. As the speed of the flywheel 12' and the plate 18' keyed thereto increases, the weights 46' swing outwardly under the influence of centrifugal force and thus through the links 47' exert a turning movement of the equalizer 40' in a counterclockwise direction as viewed in Fig. 5 and hence an outward thrust on the links 38' and the wedge blocks 24'. Under these conditions the backing members 26' have been previously set back to relieve the clutching pressure of the springs 78 upon said members and plate 73. As a consequence, when the wedge blocks 24' are moved radially outwardly by the speed responsive means above described they tend to wedge themselves between the plate 18' and the rollers 30' of the members 26' and thus act to engage the clutch and force the members 26' with the plate 73 toward the right and thus compress the springs 78. Thus as the inclined surface 75 of the blocks 24' pass the rollers 30' the clutch is engaged and this action takes place at a certain predetermined speed at which the weights 46' are overcoming the resistance of their own springs 51', the release springs 22' and the springs 78. Above this clutching speed, the flat faces or dwells 75' of the blocks 24' come under the rollers so that, as the speed is increased, pressure on the clutch faces is not increased relatively to the speed. Under these conditions the forces acting to retract the weights 46' to release the clutch are less since the springs 78 are prevented from acting to release the clutch and are actually exerting pressure through the plate 73 and the members 26' upon the blocks 24' retarding their movement to release position. Hence the speed at which release of the clutch takes place will be much less than that at which the clutch is engaged.

For disengaging the clutch manually, under conditions of emergency engagement or at any other time, the pedal operated shaft 57' has a throwout fork portion 58' engageable with a shift collar 59' on which a thrust ring 60' is carried and journaled on a ball bearing journal 79. The collar 59' is prevented from rotating by a stud 80 secured to the transmission housing 81 and slidably mounted in an apertured lug 82 on said collar. The collar 59' is also shown as slidably mounted on a bearing sleeve 83. The thrust ring 60' engages the inner ends of equally spaced radially disposed levers 84 adapted to cooperate with the adjacently mounted members 26'. Each of the levers 84 is slotted at 85 to fit over the pin 76 and has pivot portions adjacent thereto pivotally mounted on the lateral extensions 86 of said pin. The outer end 87 of each lever 84 is normally held in engagement with a lug 88 of the cooperative member 26' by a spring 89 interposed between said lever and the casing 70. The usual downward swinging movement of the pedal lever (not shown) connected with the shaft 57' and fork 58' acts to shift the collar 59' to the left, as viewed in Fig. 4, and thus swing the inner ends of the release levers 84 toward the left and consequently swing their outer ends 87 toward the right and thus act on the members 26' to shift them with the plate 73 toward the right to relieve the blocks 24' of the pressure of the springs 78 whether said springs are acting under conditions of emergency engagement or are being compressed through action of the weights 46', the blocks 24' and the backing means as previously described.

The clutch pedal associated with the shaft 57' has the same releasable stop arrangement as that of the first described construction so that the travel of the fork portion 58' is limited so that the clutch will be disengaged at idling speeds and be in a position for normal automatic operation above an idling speed.

As shown in Fig. 1, adjustment for wear of the clutch plate may be made by providing thin shims 90.

Figures 6, 10, 11:
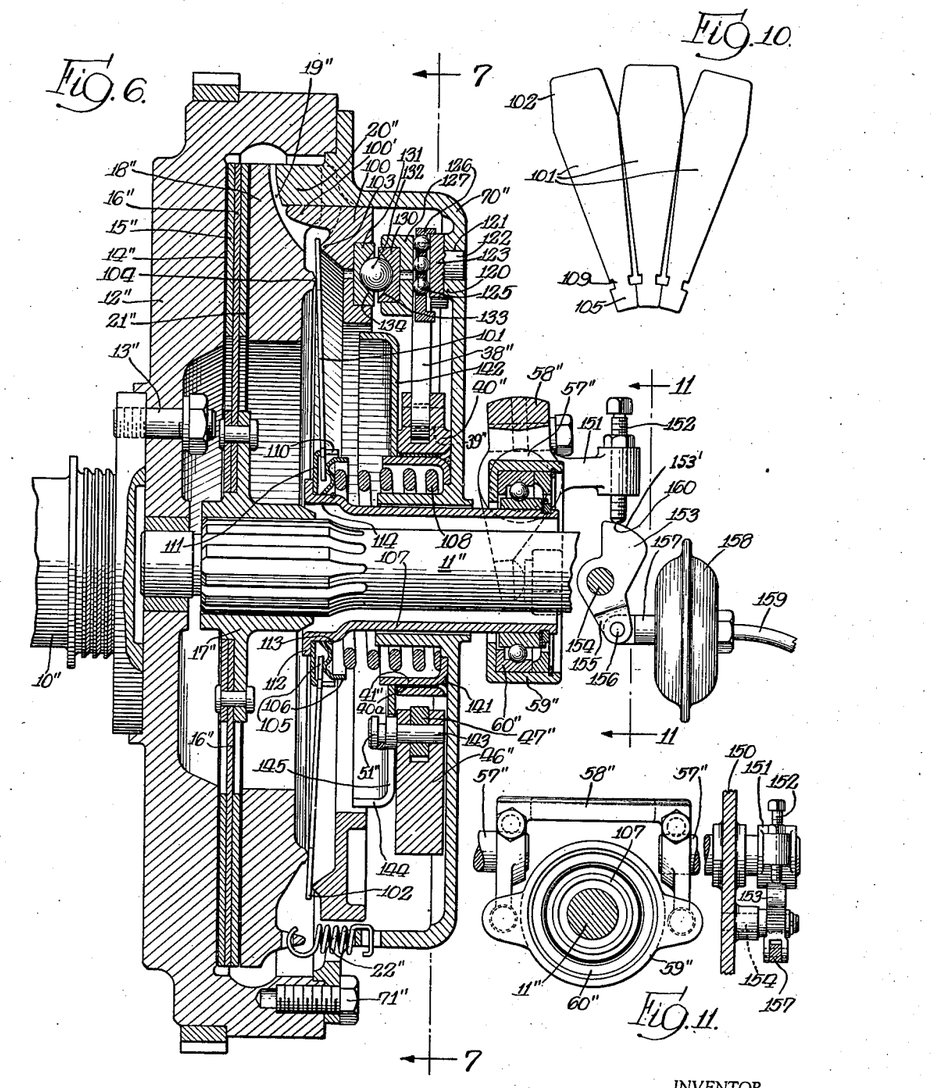
Fig. 6 is a vertical central section through another form of the invention approximately along the line 6—6 of Fig. 7.
Fig. 10 is a detail view of certain parts.
Fig. 11 is a fragmentary section along the line 11—11 of Fig. 6.

In the form illustrated in Figs. 6 to 11, the numeral 10" designates a drive element or engine shaft, 11" a driven element or transmission shaft, and 12" a flywheel secured to the shaft 10" by means of a plurality of bolt devices 13". The flywheel forms one of the clutch elements and has a clutch face 14" adapted to be engaged by the adjacent friction face 15" of a clutch element 16", which is in the form of a disk whose hub 17" is slidably splined to the driven shaft 11". A clutch element 18" in the form of an annular plate is slidably keyed to the flywheel 12" by means of a plurality of slots 19" which receive key projections 20" on a cup-shaped casing 70", the casing 70" being in turn secured to the flywheel 12" by a plurality of bolt devices 71". The plate 18" is adapted to be moved laterally into engagement with the friction face 21" of the disk 16" and acts to press the face 15" of said disk into clutched engagement with the clutch face 14" of the flywheel to form a driving connection between the drive and driven shafts. The clutch plate 18" is normally held in its release position by three equally spaced coil springs 22" which are anchored at one end to the plate and at the other end to the casing 70", as shown in Fig. 6.

In the present form of the invention, the clutch plate 18" is operated by means including a movably mounted ring 100 and a plurality of radially extending substantially flat fingers or levers 101. The ring 100 is provided with key portions 100' engaging in the slots 19" of the plate 18" so as to prevent relative rotation therebetween. The levers 101 at their outer ends 102 engage against an annular ridge 103 on the ring 100, and intermediate their ends the levers engage against an annular ridge 104 on the plate 18" which acts as a fulcrum for the levers. At the inner ends 105, the levers 101 engage a collar 106 which is movably mounted on a sleeve 107 and is pressed toward the left (Fig. 6) by a heavy coiled spring 108, the other end of which abuts the casing 70". The levers 101 are preferably shaped as illustrated in Fig. 10 and may be formed of a spring steel, and preferably have reduced portions 109 adjacent their inner ends which are interengaged in recesses 110 formed in a collar 111 which surrounds the left hand end of the sleeve 107 and abuts a flange 112 thereon. A snap ring 113 is provided to retain the collar 106 on the enlarged portion 114 of the sleeve 107. With the ring 100 in the position shown in Fig. 6, the clutch is released. However, upon movement of ring 100 toward the left, the levers 101 act to engage the clutch elements and subject them to the pressure applied on the inner end of the levers by the coiled spring 108. The mechanism for moving the ring 100 to engage and disengage the clutch, will now be described.

Figure 7:
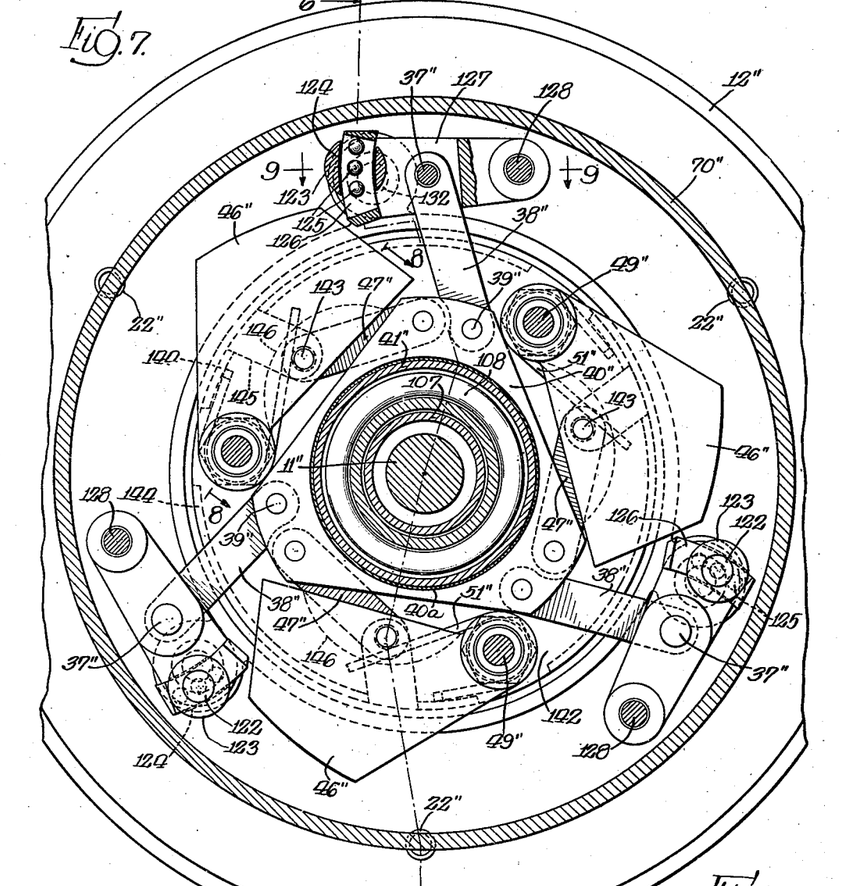
Fig. 7 is a vertical section approximately along the line 7—7 of Fig. 6.
Figure 9:
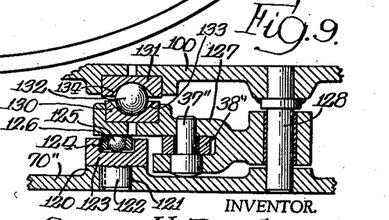
Fig. 9 is a fragmentary section along the line 9—9 of Fig. 7.

The casing 70" is provided with three inwardly extending bosses 120 which are bored at 121 to receive the shanks 122 of inserts having heads 123. The heads 123 are preferably grooved at 124, as shown in Fig. 7, to form a race way for a plurality of balls 125 held in a retainer 126. An opposing race way for the balls is formed by the free end of arms 127 which are pivotally mounted on the casing 70" by means of pins 128 (Figs. 7 and 9). The arms 127 are provided with recessed inserts 130 positioned opposite to corresponding inserts 131 in the ring 100. Metal balls 132 are located in the recesses 133 and 134 of these inserts and function, when the arms 130 are swung outwardly from the positions shown in Fig. 7, to ride up on the inclined surfaces of the recesses 133 and 134 and move the ring 100 toward the left (Fig. 6). This wedge-like action is utilized for moving the clutch elements into engagement with each other under the pressure of the clutch spring 108.

Figure 8:
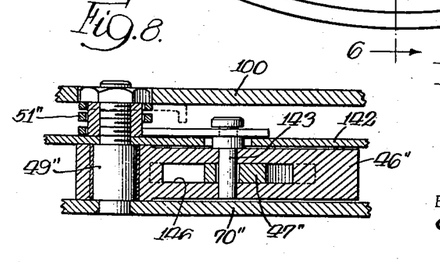
Fig. 8 is a fragmentary section along the line 8—8 of Fig. 7.

For normal automatic operation of the clutch, speed responsive means are provided for moving the arms 127 relative to the ring 100. Each of the arms 127 is bifurcated as shown in Fig. 9 and is pivotally connected by a pin 37" to one end of a link 38", the other end of which is pivotally connected by a pin 39" to an equalizer member 40" mounted, by means of a bushing 40ª, to turn freely on a hub 41" secured to the casing 70" as by welding at 141. The equalizer member 40" is held against longitudinal movement between the adjacent portion of the casing 70" and a flanged disk 142 secured to the hub 41". Governor weights 46" are each operatively connected by a link 47" with the equalizer member 40" and are pivotally mounted on studs 49" which are secured to the casing 70", as shown in Fig. 8. Each weight is normally held in contracted position by a coiled torsion spring 51" surrounding a stud 49" and suitably anchored at one end against a pivot pin 143 which connects the corresponding link 47" with the weight 46" and suitably anchored at its other end against a flange 144 of the disk 142. The pivot pins 143 pass through and move in slots 145 in the disk 142 and engage the inner ends of said slots to determine the inner positions of the weights 46". The weights are suitably slotted at 146 (Fig. 8) to receive the links 47".

The operation of this form of the invention is somewhat similar to that of the preceding forms. As the speed of the drive shaft 10" increases, the weights 46" swing outwardly under the influence of centrifugal force and thus through the links 47" effect a turning movement of the equalizer member 40" in a counterclockwise direction, as viewed in Fig. 7. The equalizer member acts through the links 38" to swing the arms 127 outwardly in a clockwise direction about their pivot pins 128. When the arms 127 swing outwardly, the balls 132 act against the inclined surfaces 133 and 134 of the inserts 130 and 131, respectively, to move the ring 100 toward the left (Fig. 6). This movement of the ring 100 operates the levers 101 to move the plate 18" toward the left and subject the plate to the pressure exerted by the coiled clutch spring 108. During this movement of the parts, the links 38" act in the manner of toggle links between the equalizer and the arms 127. As the speed of the drive shaft 10" is decreased, the weights 46" are swung inwardly by the weight springs 51" and act through the intervening mechanism to disengage the clutch.

In this form of the invention, means is also provided for engaging the clutch when the engine associated therewith is stopped. Thus a clutch pedal shaft 57" formed in two parts has a throw-out fork 58" engageable with a collar or ring 59" which has a ball bearing journal mounting 60" on the outer end of the sleeve 107 (Figs. 6 and 11). One part of the shaft 57" passes through a suitable support 150 and has secured thereto an arm 151, in the outer end of which is threaded an adjusting screw device 152. This screw device engages a cam member 153 pivoted on a pin 154 secured to the support 150, the cam member being provided with an arm extension 155 which is connected by means of a pin 156 to a rod 157 secured to one end of a compressible diaphragm device 158. The device 158 is of conventional construction with the diaphragm biased to a projected position of the rod 157. This diaphragm device may be connected as by means of a tube 159 to the intake manifold of the engine (not shown) so that when the engine is operating and the diaphragm is contracted as shown in Fig. 6, the raised portion 160 of the cam 153 serves as a stop for the screw device 152 and acts through the intervening arm 151, fork 58", collar 59", ball bearing 60", and sleeve 107 to maintain the inner ends of the levers 101 in the positions shown in Fig. 6. This may be referred to as the automatic idle position of the levers of the clutch.

As clearly seen in Fig. 6, the cam member 153 is given a particular configuration and location in order to reduce to a minimum the force required to hold the cam in operative position despite the reaction or thrust of the backing means. To that end the cam has an arcuate cam surface 153' that is concentric with the pin 154. The pin 154, in turn, is so positioned with respect to the screw 152 that a line normal to a tangent at the point of contact of the screw 152 with the cam surface 153' passes through the pin 154. Thus the thrust or reaction of the arm 151 acts through the cam member on the stationary pin 154 instead of tending to rotate the cam member. The cam member may thus be said to be disposed in the line of thrust of the backing means. With this arrangement substantially the only vacuum created force required of the suction device is that to overcome its inherent bias.

When the engine stops and the suction on the device 158 is removed, the device expands and acts to pivot the cam 153 in a clockwise direction (Fig. 6) so that the adjusting screw device 152 rides off the high portion 160 of the cam and permits the fork 58" to pivot in a clockwise direction. This allows the spring 108 to move the inner ends of the levers 101 toward the left to move the clutch parts to their positively engaged position. The clutch parts may be moved to a manual disengaged position by counterclockwise rotation of the shaft 57" by depressing the pedal, not shown in Fig. 6, but which may be similar to pedal 56 of Fig. 1.

In the form of the invention just described, the yieldable backing means includes the collar or ring 106 and the coiled spring 108, these parts corresponding to the collar 33 and spring 36 of the form of the invention illustrated in Figs. 1 to 3. In all forms of the invention, the shiftable wedge devices function to subject one element of the clutch to the pressure of the yieldable backing means for the purpose of engaging the clutch. In each instance, emergency engagement of the clutch mechanism is provided so that when used in an automotive vehicle the clutch may be engaged while the engine is dead, thereby permitting the starting of the motor by pushing the vehicle. In the form illustrated in Figs. 6 to 11, this engagement of the clutch when the motor is dead may be accomplished automatically.

By providing toggle mechanism including links (such as 38" of Figs. 6 and 7) which reach approximately dead center when the weights are fully extended, the clutch spring 108 will be practically locked in and the centrifugal weights will be substantially free from any releasing influence of the clutch spring. Thus, the weights, in their fully extended positions, would then be subject only to the releasing action of the torsion weight springs 51" surrounding their own pivots. In this manner, a delayed action is obtained in the disengagement of the clutch elements as the speed of the elements decreases, with the result that the clutch elements will be disengaged at a lower speed than that at which they were engaged. The provision of toggle links in the operating mechanism between the centrifugal weights and one of the clutch elements also results in smooth and efficient operation.

I claim as my invention:

1. A clutch having, in combination, cooperative clutch elements including a friction disk and a member engageable with said disk, backing means, radially shiftable pressure transmitting means between said member and said backing means and slidably mounted and guided on said element, speed responsive means for actuating said pressure transmitting means to apply said clutch, spring means normally acting on said backing means and urging it to a clutch applying position, and manually operable means to control the action of said spring means.

2. A clutch having, in combination, cooperative clutch elements including a friction disk and a member engageable with said disk, backing means, slidably movable pressure transmitting members between said member and said backing means and mounted and guided on said member, speed responsive means for moving said pressure transmitting members to apply said clutch, spring means normally acting on said backing means and urging it to a clutch applying position, and manually operable means to control the action of said spring means.

3. A clutch having, in combination, cooperative clutch elements including a friction disk and a member engageable with said disk, backing means, movable wedge blocks disposed between said member and said backing means and slidably mounted and guided on said member, speed responsive means for moving said wedge blocks to apply said clutch, spring means normally acting on said backing means and urging it to a clutch applying position, and manually operable means to control the action of said spring means.

4. A clutch having, in combination, cooperative clutch elements including a friction disk and a member engageable with said disk, backing means, movable members disposed between said member and said backing means and having inclined faces and lost motion dwells cooperating with said backing means and slidably mounted and guided on said member, speed responsive means for moving said members to apply said clutch, spring means normally acting on said backing means and urging it to a clutch applying position, and manually operable means to control the action of said spring means.

5. A clutch having, in combination, cooperative clutch elements including a friction disk and a member engageable with said disk, backing means including radially disposed members provided with rollers, wedge blocks disposed between said rollers and said first named member, speed responsive means for moving said blocks to apply said clutch, spring means normally acting on said backing means and urging it to a clutch applying position, and manually operable means to control the action of said spring means.

6. A clutch having, in combination, cooperative clutch elements including a friction disk and a member engageable with said disk, backing means including radially disposed levers provided with rollers, movable members disposed between said member and levers and having inclined faces and dwells cooperating with said rollers, speed responsive means for moving said members to apply said clutch, spring means normally acting on said backing means and urging it to a clutch applying position, and manually operable means to control the action of said spring means.

7. A clutch having, in combination, cooperative clutch elements including a friction disk and a member engageable with said disk, a yieldable backing means, pressure transmitting members slidably mounted on said member and engaging said backing means, an equalizer carried by said member and operatively connected with said pressure transmitting members, governor weights movable with and relative to said member and operatively connected to said equalizer to move the same and said pressure transmitting members to apply said clutch.

8. A clutch having, in combination, cooperative clutch elements including a friction disk and a member engageable with said disk, spring means to release said clutch elements, yieldable backing means, shiftable pressure transmitting means between said member and said backing means and slidably mounted and guided on said member, speed responsive means for actuating said pressure transmitting means to apply said clutch, said pressure transmitting means having a lost motion movement relative to said backing means limiting the pressure exerted by said backing means to a predetermined pressure after a predetermined speed has been reached.

9. A clutch having, in combination, cooperative clutch elements including a friction disk and a member engageable with said disk, spring means to release said clutch elements, yieldable backing means, shiftable pressure transmitting means between said member and said backing means and slidably mounted and guided on said member, speed responsive means for actuating said pressure transmitting means to apply said clutch, said pressure transmitting means having parts engaged by said backing means to resist the release of said speed responsive means and acting to hold the clutch against disengagement until a lower speed is reached from that at which the clutch was engaged.

10. A clutch having, in combination, cooperative clutch elements including a friction disk and a member engageable with said disk, backing means having radially disposed rollers, pressure transmitting members slidably mounted and guided on said member and movable radially in respect thereto, each of said pressure transmitting members having an inclined face and a flat face successively engaged by the adjacent roller of said backing means as said members are moved outwardly, speed responsive means mounted for movement in a plane at right angles to the axis of said shafts for simultaneously moving said pressure transmitting members to apply said clutch, means for retracting said speed responsive means, said flat faces providing dwells cooperating with said backing means when the latter are engaged therewith to oppose the action of said retracting means upon said speed responsive means until a lower speed is obtained than the speed at which said pressure transmitting means were moved to a clutch engaging position.

11. A clutch having, in combination, cooperative clutch elements including a friction disk and a member engageable with said disk, spring means to release said clutch elements, yieldable backing means, shiftable pressure transmitting members interposed between said member and said backing means, speed responsive means for moving said pressure transmitting members to apply said clutch, said pressure transmitting members having parts engaged by said backing means to resist the release of said speed responsive means and acting to hold the clutch against disengagement until a lower speed is reached from that at which the clutch is engaged.

12. A clutch having, in combination, cooperative clutch elements including a friction disk and a member engageable with said disk, backing means, movable pressure transmitting members disposed between said member and backing means and having inclined faces and dwells engageable with said backing means, said dwells permitting movement of said pressure transmitting members relative to said backing means after the clutch is engaged, speed responsive means for moving said members to apply said clutch, and spring means normally acting on said backing means and urging it to clutch applying position.

13. A clutch having, in combination, cooperative clutch elements including a friction disk and a member engageable with said disk, spring means to release said clutch elements, yieldable backing means, radially shiftable wedges having dwell portions and interposed between said member and said backing means, centrifugally operable governor weights, and toggle connections between said weights and said wedges including an equalizer.

14. A clutch having, in combination, cooperative clutch elements including a friction disk and a member engageable with said disk, yieldable backing means, radially movable pressure transmitting members working between said member and said backing means, each of said pressure transmitting members having an inclined face and a flat face successively engaged by said backing means as said pressure transmitting members are moved radially outwardly, speed responsive means mounted for movement in a plane at right angles to the axis of said shafts for simultaneously moving said pressure transmitting members to apply said clutch, means for retracting said speed responsive means, said flat faces providing dwells cooperating with said backing means when the latter are engaged therewith to oppose the action of said retracting means upon said speed responsive means until a lower speed is obtained than the speed at which said pressure transmitting members were moved to a clutch engaging position.

15. A clutch having, in combination, a drive element, a driven element, cooperative means associated with said elements for connecting them together in driving relation including a friction disk and a member engageable with said disk, spring pressed backing means, shiftable pressure transmitting means between said member and said backing means, speed responsive means for actuating said pressure transmitting means to engage the clutch comprising weight members pivotally mounted on axes parallel to the axis of the friction disk, and means including toggle links connecting said weight members to said pressure transmitting means and movable substantially to a locked position when said elements are connected together in driving relation.

16. A clutch having, in combination, a drive element, a driven element, cooperative means associated with said elements for connecting them together in driving relation including a friction disk and a member having an annular portion engageable with said disk, spring means to release said member and disk, spring pressed backing means, movably mounted means interposed between said member and backing means operable to engage said member and disk under pressure of said backing means, centrifugally operable weights, and means connecting said centrifugal weights to said movably mounted means including toggle links movable to a locked position causing said movably mounted means to engage said member and disk under the pressure of said backing means when the weights move outwardly.

17. An automatic clutch comprising, in combination, driving and driven elements, spring means to release said clutch elements, yieldable backing means, means including shiftable wedges operable to subject one of said elements to the pressure on said backing means, centrifugally operable weights, and toggle connections between said weights and said wedges including an equalizer.

18. An automatic clutch comprising, in combination, driving and driven elements, spring means to release said clutch elements, yieldable backing means, shiftable wedge devices interposed between said backing means and one of said elements, centrifugally operable weights, and toggle connections between said weights and said wedges.

19. An automatic clutch comprising, in combination, driving and driven elements, spring means to release said clutch elements, yieldable backing means comprising radially positioned levers pivoted at their outer ends on the drive element of the clutch, radially shiftable wedges having dwell portions and interposed between intermediate portions of said levers and the driven element of the clutch, centrifugally operable governor weights pivoted on axes parallel to the axes of the clutch elements, and means connecting said governor weights to operate said wedges comprising an equalizer member rotatably mounted co-axially with the clutch elements, toggle connections between the wedges and the equalizer member and links connecting the equalizer member with said weights.

20. An automatic clutch comprising, in combination, driving and driven elements, spring means to release said clutch elements, yieldable backing means comprising radially positioned levers pivoted at their outer ends on the drive element of the clutch and a second spring means operable on the inner ends of said levers, shiftable devices operable to subject one element of the clutch to the pressure exerted by said second spring means through said levers, centrifugally operable governor weights, and means connecting said governor weights to operate said devices including toggle connections between the devices and the equalizer member.

21. An automatic clutch comprising, in combination, driving and driven elements, means to release said clutch elements, automatic means for engaging said clutch elements comprising backing means movably mounted on one of said elements, spring means urging said backing means toward clutch engaging position, centrifugally operable weights, shiftable devices movable to a position subjecting one of said clutch elements to the pressure of said spring means, means for connecting said weights to said shiftable devices including toggle links, and means normally operable to limit the movement of the backing means in one direction to place the control of the clutch in the centrifugal weights.

22. An automatic clutch comprising, in combination, driving and driven elements, means to release said clutch elements, automatic means for engaging said clutch elements comprising backing means movably mounted on one of said elements, spring means urging said backing means toward clutch engaging position, centrifugally operable weights, shiftable devices movable to a position subjecting one of said clutch elements to the pressure of said spring means, means for connecting said weights to said shiftable devices including toggle links, means normally operable to limit the movement of the backing means in one direction to place the control of the clutch in the centrifugal weights, and means for rendering said limiting means ineffective and thereby engaging the clutch elements independently of the action of said centrifugal weights.

23. An automatic clutch comprising, in combination, driving and driven elements, spring means to release said clutch elements, automatic means for engaging said clutch elements comprising backing means movably mounted on one of said elements, shiftable wedges operable to render the backing means effective to engage the clutch, a second spring means urging said backing means toward clutch engaging position, centrifugally operable weights and toggle connections between said weights and said wedges, and means normally operable to limit the movement of the backing means toward the wedges to place the control of the clutch in the centrifugal weights.

24. An automatic clutch comprising, in combination, driving and driven elements, spring means to release said clutch elements, automatic means for engaging said clutch elements comprising backing means movably mounted on one of said elements, shiftable wedges operable to render the backing means effective to engage the clutch, a second spring means urging said backing means toward clutch engaging position, centrifugally operable weights and toggle connections between said weights and said wedges, means normally operable to limit the movement of the backing means toward the wedges to place the control of the clutch in the centrifugal weights, means for rendering said limiting means ineffective and thereby engaging the clutch elements independently of the action of said centrifugal weights, and means for moving said backing means in the opposite direction effective to disengage the clutch elements independently of the centrifugal weights.

25. An automatic clutch comprising, in combination, driving means including a pressure plate, a spring for urging said pressure plate toward clutch engaged position, a driven disk adapted to be rotated with the driving means upon engagement of the clutch, and means for automatically effecting engagement or disengagement of the driving means and driven disk comprising a plurality of centrifugal weights mounted for rotative movement with said driving means and for limited movement relative thereto with changes in the rotative speed of said driving means, means operable to subject said pressure plate to the pressure of said spring including an arm pivoted at one end and having a socket formed in one face thereof, a ball in said socket, and linkage operatively connecting said centrifugal weights and the arm pivoting said arm with movement of the weights under centrifugal force to effect engagement of the clutch.

26. An automatic clutch comprising, in combination, rotatable driving means, driven means adapted to be rotated with the driving means upon engagement of the clutch, and means for automatically effecting engagement or disengagement of the driving and driven means depending upon the speed of rotation of the driving means comprising a plurality of centrifugal weights mounted for rotative movement with said driving means and for limited movement relative to said driving means with changes in the rotative speed of said driving means, a spring pressed backing means, means operable by said weights for effecting engagement between said driving and driven means under pressure of said backing means including toggle mechanism having toggle links which move substantially to a dead center position when the weights are fully extended, and spring means associated with said weights for returning the weights to their contracted positions as the speed of the clutch decreases.

27. An automatic clutch comprising in combination rotative driving means, driven means adapted to be rotated with the driving means upon engagement of the clutch, and means for automatically effecting engagement or disengagement of the driving and driven means comprising a plurality of centrifugal weights mounted for rotative movement with said driving means and for limited movement relative thereto with changes in the rotative speed of said driving means, toggle means operable upon actuation to effect engagement of said driving and driven means, said toggle means having a normal position in which the driving and driven means are disengaged and being constructed to effect a successively decreasing movement of the clutch means toward engaged position with movement of the toggle means away from normal position, and linkage connecting the centrifugal weights and said toggle means effective to impart successively increasing movement to said toggle means with movement of the weights away from normal position.

28. An automatic clutch comprising, in combination, driving and driven elements, means to release said clutch elements, automatic means for engaging said clutch elements comprising backing means movably mounted on one of said elements, spring means urging said backing means toward clutch engaging position, centrifugally operable weights, shiftable devices movable to a position subjecting one of said clutch elements to the pressure of said spring means, means for connecting said weights to said shiftable devices including toggle links, means including a vacuum operated device normally operable to limit the movement of the backing means in one direction to place the control of the clutch in the centrifugal weights, and means for rendering said limiting means ineffective and thereby engaging the clutch elements independently of the action of said centrifugal weights.

29. An automatic clutch comprising, in combination, driving and driven elements, means to release said clutch elements, automatic means for engaging said clutch elements comprising backing means movably mounted on one of said elements, spring means urging said backing means toward clutch engaging position, centrifugally operable weights, shiftable devices movable to a position subjecting one of said clutch elements to the pressure of said spring means, means for connecting said weights to said shiftable devices including toggle links, a movable abutment device positionable in an operative position where it takes the thrust of said backing means in one direction to limit the movement of the backing means in that direction and place the control of the clutch in the centrifugal weights, and vacuum operated means connected to said abutment device for moving the same, said vacuum device being biased to move said abutment device out of the line of thrust of said backing means thereby permitting engagement of the clutch elements by action of said spring means independently of the action of said centrifugal weights and tending to move said abtutment device to operative position when evacuated.

30. An automatic clutch comprising, in combination, driving and driven elements, means to release said clutch elements, automatic means for engaging said clutch elements comprising backing means movably mounted on one of said elements, spring means urging said backing means toward clutch engaging position, centrifugally operable weights, shiftable devices movable to a position subjecting one of said clutch elements to the pressure of said spring means, means for connecting said weights to said shiftable devices including toggle links, a pivoted throwout fork associated with said backing means, a pivotally mounted abutment device interposable in the line of thrust between said fork and the pivot point of said abutment device to limit the movement of the backing means in one direction and place control of the clutch in the centrifugal weights, and vacuum operated means connected to said abutment device for controlling the position thereof, said vacuum device being biased to pivot said abutment device out of the line of thrust of said fork and tending when evacuated to pivot said abutment device into the line of thrust.

OSCAR H. BANKER.